United States Patent [19]
Blümel et al.

[11] 4,081,502
[45] Mar. 28, 1978

[54] PROCESS FOR THE PRODUCTION OF HOMOGENEOUS, BAR-SHAPED OR GRANULAR THERMOPLASTIC COMPOSITIONS

[75] Inventors: Harald Blümel; Paul Lipp, both of Marl, Germany

[73] Assignee: Chemische Werke Huls Aktiengesellschaft, Marl, Germany

[21] Appl. No.: 623,510

[22] Filed: Oct. 17, 1975

[30] Foreign Application Priority Data

Oct. 19, 1974  Germany ............................... 2449491

[51] Int. Cl.² ............................................... B02C 4/00
[52] U.S. Cl. ............................ 264/140; 260/28.5 AS; 260/4 R; 260/5; 264/144
[58] Field of Search ................. 260/28.5 AS; 264/140, 264/144

[56] References Cited
U.S. PATENT DOCUMENTS 3,963,659   6/1976   Binder et al. ................. 260/28.5 AS

OTHER PUBLICATIONS

Plastics Mold Engineering, Revised Edition (1965) pp. 451, 452 and 453.

Primary Examiner—Melvyn I. Marquis
Attorney, Agent, or Firm—Millen & White

[57] ABSTRACT

A process for the production of a thermoplastic composition comprising a homogeneous blend of (i) 100 parts by weight of a saturated or unsaturated polyolefin elastomer having a green polymer tensile strength of at least 20 kp./cm² at 25° C. and a viscosity of 20–150 Mooney units ($ML_{1+4}$ at 100° C.) and (ii) 25–900 parts by weight of bitumen, which comprises:

(a) admixing bitumen with said elastomer in a kneader at a temperature of about 50°–220° C. for about 1–100 minutes to form a viscous homogeneous composition;

(b) cooling the resultant composition to minimize the adhesion to the inner wall and rotor of the kneader; and (c) ejecting at least 95% of the cooled composition from the kneader.

18 Claims, No Drawings

PROCESS FOR THE PRODUCTION OF HOMOGENEOUS, BAR-SHAPED OR GRANULAR THERMOPLASTIC COMPOSITIONS

BACKGROUND OF THE INVENTION

The present invention relates to a process for the production of homogeneous bar-shaped or granular-shaped thermoplastic compositions containing polymers and bitumen.

It is known that the property spectrum of bitumen can be improved by the addition of polymers, either thermoplastics, e.g. polyethylene, atactic polypropylene, polybutene, etc., or cross-linkable elastomers, e.g. natural rubber (NR), styrene-butadiene rubbers (SBR), polychloroprene rubbers (CR), acrylonitrile-butadiene rubbers (NBR), polybutadiene rubbers (BR), polyisoprene rubbers (IR), butyl rubbers (IIR), ethylene-α-olefin rubbers (EPM and EPDM), and ethylene-vinyl acetate or -acrylic acid or -acrylic acid ester copolymers; see, for example, U.S. Pat. No. 3,336,252; J. Appl. Chem. 7: 481–90 (1975); "Bitumen, Teere, Asphalte, Peche" [Bitumen, Tars, Asphalts, Pitches] 1966, issue 9; and Rubber Trend, March 1968.

Ethylene-α-olefin copolymers and the ethylene-α-olefin-diene terpolymers are particularly suitable for this purpose due to their excellent stability against long-term elevated temperatures during transport and storage, as well as against open-air weathering mainly caused by ultraviolet radiation or the action of ozone.

According to the disclosure in DAS [German Published Application] No. 1,939,926, corresponding to copending, commonly assigned U.S. Pat. No. 3,963,659, the contents of which are incorporated by reference herein, thermoplastic compositions are advantageously produced from bitumen and 0.5–25 parts by weight of an ethylene-α-olefin elastomer by preliminarily kneading the ethylene-α-olefin elastomer and adding the bitumen either in small incremental portions or gradually in a continuous fashion. Although homogeneous compositions are obtained in this way, the process is time-consuming and thus uneconomical.

Therefore, there still exists a need for a process wherein thermoplastic compositions of bitumen and saturated and unsaturated polyolefin elastomers are obtained in the particularly valuable forms of a bar or granules. These shapes provide marked advantages for both transportation and storage as well as for further processing operations, especially for direct incorporation into liquid bitumen. The present invention fills such needs.

OBJECTS OF THE INVENTION

Accordingly, it is a general object of this invention to provide an economical process for preparing blends of bitumen and elastomeric polyolefins.

Another object of this invention is to provide a process for preparing such blends in the form of shaped objects having a granular or bar (narrow sheet) configuration.

A further object of this invention is to provide a method for both shortening mixing time and improving discharge yields of homogeneous bitumen-elastomeric polyolefin blends.

An additional object of this invention is to provide bars or granules of bitumen-elastomeric polyolefin blends which are easily shipped, exhibit good storage stability and can be directly processed into shaped objects without further mixing or preliminary processing.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by providing a process for the production of a thermoplastic composition comprising a homogeneous blend of (i) 100 parts by weight of a saturated or unsaturated polyolefin elastomer having a green polymer tensile strength of at least 20 kp./cm$^2$ at 25° C. and a viscosity of 20–150 Mooney units ($ML_{1+4}$ at 100° C.) and (ii) 25–900 parts by weight of bitumen, which comprises:

(a) admixing bitumen with said elastomer in a kneader at a temperature of about 50°–220° C. for about 1–100 minutes to form a viscous, homogeneous composition;

(b) cooling the resultant composition to minimize the adhesion to the inner wall and rotors of the kneader; and (c) ejecting at least 95% of the cooled composition from the kneader.

DETAILED DISCUSSION

It has now been found possible to obtain homogeneous bar-shaped or granular-shaped thermoplastic compositions on the basis of saturated or unsaturated polyolefin elastomers as well as bitumen.

Bitumens, also known as bitumina, asphalt-containing petroleum residuums and asphaltic flux, are the asphaltic, non-distillable residues of crude oil refining. Except for the well-known blowing technique for increasing softening points and the pyrophoric changes which occur during refining, conventional bitumens are chemically unmodified. Depending on their source in the refining process, they are known as primary bitumens, high-vacuum bitumens, bituminous blends, bituminous coal tars, which are chemically unmodified, and blown bitumens, which have been exposed while hot to the oxidizing effect of a stream of air. It is this class of non-distillable residues, viz., chemically unmodified and blown bitumens, which are the preferred starting materials for the process of this invention.

The bitumens which are preferably employed in the process of this invention are primary bitumens, B 300 (27°–37° C.), B 200 (37°–44° C.), B 80 (44°–49° C.), B 65 (49°–54° C.), B 45 (54°–59° C.), B 25 (59°–67° C.) and B 15 (67°–72° C.), and blown bitumens, e.g. 75/30 (70°–80° C.), 85/25 (80°–90° C.), 85/40 (80°–90° C.), 100/25 (95°–105° C.), 105/15 (100°–110° C.), 115/15 (110°–120° C.) and 135/10 (130°–140° C.). The softening points were measured by the ring and ball method according to DIN 1995.

Saturated and unsaturated polyolefin elastomers are understood to mean, within the scope of this invention, products which can be produced from ethylene, one or more α-olefins of 3–8 carbon atoms and optionally one or more unconjugated multiple olefins with the aid of so-called Ziegler-Natta catalysts which can additionally contain activators and modifiers, in a solution or dispersion at temperatures of −30° to +100° C., e.g. in accordance with the methods of DOS's (German Unexamined Laid-Open Applications) Nos. 1,570,352; 1,595,442; and 1,720,450; as well as German Patent Application No. P 24 27 343.6 corresponding to co-pending, commonly assigned U.S. patent application Ser. No. 578,947 filed May 19, 1975, now abandoned the contents of which are incorporated by reference herein.

Preferred are saturated polyolefin elastomers consisting essentially of 15-90% by weight, preferably 30-75% by weight of ethylene and correspondingly 85-10% by weight, preferably 70-25% by weight of propylene and/or butene-1, and unsaturated polyolefin elastomers which in addition to containing ethylene and propylene and/or butene-1 within the above limits further contain an unconjugated multiple olefin, in an amount such that 0.5-30, preferably 2-15, double bonds per 1000 carbon atoms are contained in the elastomer as determined by infrared spectroscopy according to Angewandte Makromolekulare Chemie 12:73-78 (1970). Especially preferred multiple olefins are cis- and trans-1,4-hexadiene, dicyclopentadiene, methylene-, ethylidene- and propenylnorbornene.

An important aspect and a critical feature of the process according to this invention is that the saturated and unsaturated polyolefin elastomers have a green polymer tensile strength according to DIN 53,504 of at least 20 and up to 220, preferably 50-190 kp./cm$^2$ (measured at 25° C.). This criterion is met by the so-called block or sequence polymers, i.e. ethylene-$\alpha$-olefin copolymers or ethylene-$\alpha$-olefin-diene terpolymers containing ethylene or one of the $\alpha$-olefins, besides a statistical distribution of the monomers in the polymer chain, in the form of differently long chain sections.

Due to this structural peculiarity, the sequence polymers can be produced in the form of crumbs, granules or powders, i.e. as comminuted solids having an enlarged surface area, which is of special advantage for the process according to the present invention.

In addition to the required green polymer tensile strength it is important that the polymers to be used in this connection exhibit a viscosity of 20-150, preferably 40-100, expressed in Mooney units ($ML_{1+4}$ at 100° C.) according to DIN 53,523.

In addition to the saturated and unsaturated polyolefin elastomers of the sequence type, it is possible to blend in the claimed process up to 25%, based on the total amount of component (i), of a polyolefin or another elastomer.

Suitable polyolefins for use in such blends include but are not limited to crystalline and/or partially crystalline modifications of polyethylene with densities of 0.910-0.975 g./cm$^3$, RSV values of 0.5-3.3 dl./g. and melt indices of 0.2-50 g./10 min.; polypropylenes with densities of 0.90-0.910 g./cm$^3$, RSV values of 1.0-10 dl./g. and melt indices of 0.1-50 g./10 min.; polybutenes with densities of 0.910-0.925 g./cm$^3$, RSV values of 1.0-10 d./g. and melt indices of 0.1-100 g./10 min.; as well as atactic polypropylenes with densities of 0.86 g./cm$^3$ and RSV values of 0.1-3.0 dl./g. and atactic polybutylenes with densities of 0.86 g./cm$^3$ and RSV values of 0.1-3.0 dl./g. By atactic as used here is meant that the sequence of the steric arrangements of the assymmetric centres of the polymeric chain is random, or very nearly so.

Other elastomers which can similarly be employed as a blend component are, for example, natural rubber (NR), styrene-butadiene rubber (SBR), polychloroprene rubber (CR), acrylonitrile-butadiene rubber (NBR), polybutadiene rubber (BR), polyisoprene rubber (IR), butyl rubber (IIR), random-polymerized ethylene-$\alpha$-olefin rubbers (EPM and EPDM), and ethylene-vinyl acetate or -acrylic acid or -acrylic acid ester copolymers.

In addition to components (i) and (ii), it is possible to add, in the process of this invention, (iii) an amount of up to 500 parts by weight, preferably 1-100 parts by weight, of a filler and/or (iv) an amount of up to 50 parts by weight, preferably 1-30 parts by weight, of a plasticizer. Suitable fillers are well known in the art and include but are not limited to carbon blacks of all activity stages, as well as the customarily used mineral products, e.g. chalk, silicates and highly active silicic acids. Suitable plasticizers are the conventional refinery products likewise well known in the art, especially mineral oils having predominantly aromatic, naphthenic or paraffinic components.

The process of this invention is generally conducted by first homogenizing components (i) and (ii), as well as optionally components (iii) and (iv) in a commercial, coolable internal mixer with a plunger, if desired under heating. The homogenizing times are dependent on the recipe utilized, the structure of the starting materials, the constructional features of the mixing unit and the selected process conditions, i.e. batch temperature (generally 50°-220°, preferably 80°-150° C.), the extent to which the internal mixer is filled (generally 1.0-1.8, preferably 1.2-1.5, based on its useful capacity), and rotor speeds (generally 5-100 r.p.m., preferably 10-40 r.p.m.). Typical homogenizing times are generally 1-100, preferably 5-30 minutes. After homogenization is effected, the composition, the temperature of which ranges normally between 50° and 220° C., is cooled in the internal mixer (cooling time 1-30, preferably 3-15 minutes) to such an extent that these compositions do not show their typical firm adhesion to the inner wall and rotors of the mixer which frequently prevents ejection of the batches. The mass is sufficiently cooled to avoid adhesion to the inner wall and rotor of the kneader. Only in this way has it been found possible to carry out an economical production of homogeneous thermoplastic compositions made up of saturated and unsaturated polyolefin elastomers and bitumen.

The composition discharged from the internal mixer is then converted into a slab 0.3-2 cm., preferably 0.8-1.8 cm. thick, with the aid of paired rollers generally disposed downstream of the mixer; these rollers usually have a surface temperature of 10°-100°, preferably 20°-60° C. This slab is then cut out in the form of bars (narrow sheets or bands) 1-30 cm., preferably 3-15 cm. in width, which are optionally granulated. The granulating step can be executed, for example, by means of a band granulator or extruder granulator. In general, the granulated particles have dimensions (mean diameter) of between 0.1 and 50 mm., preferably between 2 and 20 mm. It is advantageous to powder the granules or bars slightly in case of intended storage, e.g. with talc, in order to prevent caking.

The bars and granules produced according to the process of this invention can advantageously be utilized directly for processing by extrusion, injection molding, piston-type extrusion and calendering, so that expensive mixing or preliminary processing plants are eliminated. The granules moreover offer the advantage that they essentially facilitate incorporation of the polymer into liquid bitumen and thus the transfer of the valuable properties of the ethylene-propylene elastomer to bitumen.

The process of this invention is to be explained by means of the following Examples.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

The extent to which the internal mixer is filled refers to numerical values which reflect the ratio of the volume of all the compound ingredients to the volume of the useful kneader capacity.

The inner mixer parts in contact with the blended mass in the following examples were made of steel.

EXAMPLE 1

In a laboratory kneader which can be cooled and heated and has a useful capacity of 2 liters (Werner and Pfleiderer type GK2, with plunger), 1040 g. of an unsaturated ethylene-propylene-diene elastomer in crumb form (diene = ethylidene-norbornene; 30% by weight propylene; 8 double bonds per 1000 carbon atoms, $ML_{1+4}$ (at 100° C.) = 87; green polymer tensile strength = 140 kp./cm$^2$), which is denoted EPDM 1 in the following table, is mixed with 1040 g. of bitumen B 200 (according to DIN 1995) in the following manner and time period:

| Mixing Step | Time (min.) |
|---|---|
| Introduction of 409 g. EPDM 1 | 0 |
| Introduction of 205 g. EPDM 1 and 409 g. B 200 | 1 |
| Introduction of 426 g. EPDM 1 and 631 g. B 200 | 6 |
| Open cooling water valves | 13 |
| Ejection (Discharge) | 16 |

The jacket temperature was 80° C. at the beginning of the mixing step and the rotor speed was 40 r.p.m. After a total mixing time of 16 minutes, 96% by weight of the EPDM 1/bitumen batch could be discharged by opening the mixing chamber and the internal wall of the mixing chamber and the rotors remained free of adhering mixture material. The ejection temperature of the composition was 105° C. After ejection, the batch was converted into a slab with the aid of roller pairs (surface temperature 40° C.) and by means of a cutter, a rod having a width of 30 mm. and a thickness of 6 mm. was taken from this slab. The rod was fed to a twin-screw extruder having a screw diameter of 45 mm. and an L/D ratio of 17, and divided into lenticular granules having the dimensions of 4 × 6 mm. by means of a granulating machine customary for synthetic resins. After being slightly powdered with talc, the granulated material could be stored at temperatures of up to 40° C. without caking for a long time, e.g. up to 12 months.

EXAMPLE 2

Using basically the same mode of operation as described in connection with Example 1, an unsaturated ethylene-propylene-diene elastomer, with dicyclopentadiene as the ternary component, called EPDM 2 in the table (31% by weight of propylene, 7 double bonds per 1000 carbon atoms, $ML_{1+4}$ at 100° C. = 60, green polymer tensile strength = 90 kp./cm$^2$) was mixed in the same quantitative ratio with bitumen B 200. The cooling time was, in a deviation from Example 1, 6 minutes; the total mixing time up to homogenization was 19 minutes. The batch could be discharge to a yield of 97%.

EXAMPLE 3

Analogously to the mode of operation described in Example 1, 1040 g. of a saturated ethylene-propylene elastomer (29% by weight of propylene, $ML_{1+4}$ at 100° C. = 69, green polymer tensile strength = 144 kp./cm$^2$), denoted by EPM in the subsequent table, was mixed with 1040 g. of bitumen B 200. The batch could be ejected in homogeneous form to a yield of 97% after a mixing time of 16 minutes. The batch was fed, after being cut from the roll at a surface temperature of 60° C. in the band width described in Example 1, to a band granulator wherein a granulated material with granules of 40 × 5 × 5 mm. was obtained.

EXAMPLE 4

2600 g. of EPDM 1 was homogenized with 690 g. of bitumen B 200 according to the following mixing cycle:

| Mixing Step | Time (min.) |
|---|---|
| Introduction of 90 g. EPDM 1 | 0 |
| Introduction of 845 g. EPDM 1 and 345 g. B 200 | 1 |
| Introduction of 845 g. EPDM 1 and 345 g. B 200 | 4 |
| Open cooling water valves | 6 |
| Ejection | 12 |

The jacket temperature was, at the beginning of the mixing step, 40° C. and the rotor speed was 40 r.p.m. The temperature of the batch and the extent to which it was discharged were the same as in Example 1.

EXAMPLE 5

Analogously to Example 3, an EPM/bitumen batch was prepared wherein B 100/25 was used in place of B 200. The homogeneous composition could likewise be discharged after 16 minutes, with a yield of 98%.

EXAMPLE 6

690 g. of EPDM 1 was homogenized with 1600 g. of B 100/25 according to the following mixing cycle:

| Mixing Step | Time (min.) |
|---|---|
| Introduction of 325 g. EPDM 1 | 0 |
| Introduction of 182 g. EPDM 1 and 790 g. B 100/25 | 1 |
| Introduction of 183 g. EPDM 1 and 810 g. B 100/25 | 9 |
| Open cooling water valves | 19 |
| Ejection | 27 |

With only minor adherence to interior of the kneader, 98% of the batch was discharged upon ejection.

EXAMPLE 7

The mode of operation and the quantitative ratios of Example 1 were repeated, except that a different ethylenepropylene-diene elastomer was used (diene = ethylidene-norbornene, 29% by weight of propylene, 8 double bonds per 1000 carbon atoms, $ML_{1+4}$ 100° C. = 41, green polymer tensile strength = 43 kp./cm$^2$), called EPDM 3 in the following table, thus attaining a different batch temperature (85° C.). The recovery upon ejection was 95%.

EXAMPLE 8

A batch was prepared analogously to Example 2, but modified by using a jacket temperature of 130° C. and replacing 240 g. of EPDM used at minute 0 with polypropylene having a melt index of 2.5 g./10 min., an RSV value of 2.0 dl./g. and a density of 0.906 g./cm³. At a discharge temperature of 160° C., 99% of the composition was ejected.

EXAMPLE 9

A batch was prepared as in Example 2, but with the modification of using 208 g. of a styrene-butadiene elastomer (SBR type 1572) instead of the same amount of EPDM used at minute 0. The discharge yield was 95%.

EXAMPLE 10

Instead of using 208 g. of SBR according to Example 9, the same quantity of an EPDM elastomer was utilized having a statistically random monomer distribution (diene-ethylidenenorbornene, 45% by weight of propylene, 8 double bonds per 1000 carbon atoms, $ML_{1+4}$ 100° C. = 110, green polymer tensile strength = 7 kp./cm²), denoted as EPDM 4 in the following table. The discharge yield was 96% with an ejection temperature of 115° C.

EXAMPLE 11

At a kneader temperature of 80° C., a degree of filling of the internal mixer of 1.5 and a rotor speed of 40 r.p.m., a batch was produced having the composition set forth below with the indicated mixing times:

| Mixing Step | Time (min.) |
| --- | --- |
| Introduction of 1031 g. EPDM 1 Introduction of 207 g. polyethylene (density 0.945 g./cm³, RSV 1.45 dl./g., melt index 7 gl/10 min.) | 0 |
| 300 g. HAF black 732 g. SRF black, and 206 g. naphthenic mineral oil | |
| Introduction of 723 g. bitumen B 80 and 205 g. powdered chalk | 5 |
| Open cooling water valves | 10 |
| Ejection | 12 |

The batch was discharged at a composition temperature of 155° C. to a yield of 98% and was granulated as set forth in Example 3.

The advantages of the batches prepared according to the process of this invention, for example when incorporated into liquid bitumen, are shown in columns 7 and 12 of the table below. All polymers were comminuted to particle sizes of 1–7, mm., to provide surface-equivalent conditions with respect to the batch-wise granulated materials.

| Polymer | Diene (EPDM) | $C_3H_6$ Proportion (% by Wt) | $C=C/$ 1000 C (EPDM) | $ML_{1+4}$ (100° C.) | Green Polymer Tensile Strength (kp/cm²) | Homogeneity in Liqu. Bitumen[3][4] Mixing Time, min. | Homogeneity of Kneader Batch | Adhesion to Inner Kneader Wall | Ejection in % | Roll and Granulating Behavior | Homogeneity in Liqu. Bitumen[3][5] Mixing Time, min. |
| --- | --- | --- | --- | --- | --- | --- | --- | --- | --- | --- | --- |
| EPDM 1 | EN(1) | 30 | 8 | 87 | 140 | 30 | Very good | Very minor | 96 | Very good | 25 |
| EPDM 2 | DCP(2) | 31 | 7 | 60 | 90 | 28 | Good | Minor | 97 | Good | 23 |
| EPDM 3 | EN | 29 | 8 | 41 | 43 | 25 | Good | Minor | 95 | Good | 17 |
| EPDM 4 | EN | 45 | 8 | 110 | 7 | 45 | Moderate | Medium | 85 | Moderate | 32 |
| EPM | — | 29 | — | 69 | 144 | 35 | Very good | Minor | 97 | Very good | 25 |
| NR | — | — | — | 63 | 2 | >100 | Moderate | High | 70 | Moderately poor | >100 |
| SBR 1 | — | — | — | 50 | 5 | >100 | Poor | Very high | 50 | Very poor | >100 |
| SBR 2 | — | — | — | 115 | 7 | >100 | Moderate | High | 70 | Poor | >100 |
| BR | — | — | — | 45 | 1 | >100 | Poor | High | 60 | Poor | >100 |
| CR 1 | — | — | — | 100 | 100 | >100 | Poor | High | 50 | Poor | >100 |
| CR 2 | — | — | — | 85 | 10 | >100 | Poor | High | 60 | Poor | >100 |

EXPLANATIONS FOR THE TABLE:
[1] EN = ethylidene-norbornene
[2] DCP = dicyclopentadiene
[3] The mode of operation utilized for incorporating the various types of elastomers and/or batches was as follows: 200 g. of elastomer and/or 400 g. of the batch (50 : 50) was stirred into 1800 g. and 1600 g., respectively, of a bitumen B 200 (DIN 1995) heated to 180° C., by means of a simple vane-type agitator rotating at 180 r.p.m. After the temperature has increased to 210–230° C., a viscosity increase (which is frequently marked) and homogenization occurred at the times shown in the Table.
[4] The time is set forth (in minutes) which was required for obtaining optimum homogeneity of the polymer in liquid bitumen according to the method described in (3).
[5] The time is indicated (in minutes) which was required to attain optimum homogeneity of the batch in liquid bitumen in accordance with the mode of operation described in (3).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a thermoplastic composition comprising a homogeneous blend of
   (i) 100 parts by weight of a saturated or unsaturated block polyolefin elastomer having a green polymer tensile strength of at least 20 and up to 220 kp./cm² at 25° C. and a viscosity of 20–150 Mooney units ($ML_{1+4}$ at 100° C.) and (ii) 25-900 parts by weight of bitumen, which comprises:
  (a) kneading bitumen with crumbs, granules or powders of said elastomer in a kneader at a temperature of about 50°–220° C. for about 1–100 minutes to form a viscous, homogeneous composition;
  (b) after homogenization is effected, cooling the resultant composition sufficiently to minimize the adhesion to the inner wall and rotor of the kneader which adhesion in the absence of said cooling frequently prevents ejection of the composition; and
  (c) ejecting at least 95% of the cooled composition from the kneader.

2. A process according to claim 1, wherein said thermoplastic composition further comprises up to 25% by weight, based on the weight of the elastomer, of a polyolefin homopolymer of ethylene, propylene or butene.

3. A process according to claim 2, wherein said thermoplastic composition further comprises up to 25% by weight, based on the weight of the elastomer, of an additional elastomer selected from the group consisting of natural rubber, styrene-butadiene rubber, polychloroprene rubber, acrylonitrile-butadiene rubber, polybutadiene rubber, polyisoprene rubber, butyl rubber, random-polymerized ethylene-α-olefin rubbers, and ethylene-vinyl acetate or -acrylic acid or -acrylic acid ester copolymers.

4. A process according to claim 3, wherein said random-polymerized ethylene-α-olefin rubbers are selected from EPM, EPDM and mixtures thereof.

5. A process according to claim 1, wherein said elastomer consists essentially of 15–90% by weight of ethylene and correspondingly 85–10% by weight of at least one member selected from the group consisting of propylene and butene-1.

6. A process according to claim 5, wherein said elastomer is an olefinically saturated sequence copolymer.

7. A process according to claim 5, wherein said elastomer further comprises an unconjugated multiolefin in an amount sufficient to provide 0.5–30 olefinically unsaturated bonds per 1000 carbon atoms.

8. A process according to claim 7, wherein said multiolefin is selected from the group consisting of 1,4-hexadiene, dicyclopentadiene, methylene-, ethylidene- or propenyl-norbornene.

9. A process according to claim 5, wherein said elastomer has a green polymer tensile strength of 50–190 kp./cm$^2$ and a viscosity of 40–100 Mooney units.

10. A process according to claim 1, wherein said bitumen is a primary bitumen or a blown bitumen.

11. A process according to claim 10, wherein said bitumen is B 80, B 200 or B 100/25.

12. A process according to claim 10, wherein said elastomer consists essentially of 15–90% by weight of ethylene and correspondingly 85–10% by weight of at least one member selected from the group consisting of propylene and butene-1.

13. A process according to claim 12, wherein said elastomer has a green polymer tensile strength of 50–190 kp./cm$^2$ and a viscosity of 40–100 Mooney units.

14. A process according to claim 1, wherein said homogeneous blend further comprises an amount of up to 500 parts by weight of a filler.

15. A process according to claim 1, wherein said homogeneous further comprises an amount of up to 50 parts by weight of a plasticizer.

16. A process according to claim 2, wherein said elastomer consists essentially of 15–90% by weight of ethylene and correspondingly 85–10% by weight of at least one member selected from the group consisting of propylene and butene-1, having a green polymer tensile strength of 50–190 kp./cm$^2$ and a viscosity of 40–100 Mooney units; said bitumen is a primary bitumen or a blown bitumen; said admixture is effected in a coolable internal mixer with a plunger at a batch temperature of 80°–100° C. and a rotor speed of 5–100 r.p.m. for 5–30 minutes and the resultant composition cooled for 1–30 minutes.

17. A process according to claim 1, further comprising forming the resultant composition into bars or granules and applying an anticaking agent to the surface thereof.

18. A process according to claim 1, wherein said composition consists essentially of elastomeric material, bitumen, and optionally filler and plasticizer.

* * * * *

UNITED STATES PATENT AND TRADEMARK OFFICE
CERTIFICATE OF CORRECTION

PATENT NO. : 4,081,502
DATED : March 28, 1978
INVENTOR(S) : HARALD BLÜMEL ET AL.

It is certified that error appears in the above-identified patent and that said Letters Patent are hereby corrected as shown below:

Claim 15, col. 10, lines 23: Change "homogeneous further" to read -- homogeneous blend further --.

Signed and Sealed this

Eighth Day of August 1978

[SEAL]

Attest:

RUTH C. MASON
*Attesting Officer*

DONALD W. BANNER
*Commissioner of Patents and Trademarks*